(12) United States Patent
Nagatomi et al.

(10) Patent No.: US 7,209,415 B2
(45) Date of Patent: Apr. 24, 2007

(54) OPTICAL PICKUP DEVICE AND RECORDING AND/OR REPRODUCING DEVICE

(75) Inventors: Kenji Nagatomi, Gifu (JP); Seiji Kajiyama, Gifu (JP); Yoichi Tsuchiya, Hashima (JP)

(73) Assignee: Sanyo Electric Co., Ltd., Osaka (JP)

( * ) Notice: Subject to any disclaimer, the term of this patent is extended or adjusted under 35 U.S.C. 154(b) by 551 days.

(21) Appl. No.: 10/689,655

(22) Filed: Oct. 22, 2003

(65) Prior Publication Data
US 2004/0081058 A1 Apr. 29, 2004

(30) Foreign Application Priority Data
Oct. 29, 2002 (JP) ............................. 2002-313596

(51) Int. Cl.
*G11B 7/00* (2006.01)
(52) U.S. Cl. ................................ 369/44.23; 369/112.02
(58) Field of Classification Search ................ 369/112, 369/44.23, 112.01, 112.02
See application file for complete search history.

(56) References Cited

U.S. PATENT DOCUMENTS

| | | | | |
|---|---|---|---|---|
| 5,473,154 A | * | 12/1995 | Eguchi et al. | 250/201.5 |
| 5,867,468 A | * | 2/1999 | Mori et al. | 369/112.12 |
| 6,707,615 B2 | * | 3/2004 | Mori et al. | 359/641 |
| 6,781,944 B1 | * | 8/2004 | Tanaka | 369/112.12 |

FOREIGN PATENT DOCUMENTS

JP P2001-507463 A 6/2001

OTHER PUBLICATIONS

"Liquid Crystal High Polymer" published by Sigma Corporation, Feb. 8, 1988.

* cited by examiner

*Primary Examiner*—Wayne Young
*Assistant Examiner*—Minerva Rivero
(74) *Attorney, Agent, or Firm*—McDermott Will & Emery LLP

(57) ABSTRACT

Provided are an optical pickup device, which is capable of detecting and correcting spherical aberration while suppressing an increase in the number of construction elements and without increasing outer dimensions of a pickup device main body, and a recording and/or reproducing device having the optical pickup device built therein. A lens is designed such that when the thickness of a disk protective layer is greater than an optimum value, returning light (reflection light) from a disk is condensed on a sensor. The sensor is arranged at a condensing point and has a shape with which around 50% of the returning light is received when the thickness of the protective layer assumes the optimum value. With this construction, the quantity of light received by the sensor is increased when the thickness of the protective layer is greater than the optimum value, and is conversely reduced when the thickness of the protective layer is smaller than the optimum value. As a result, it becomes possible to detect the direction and degree of a thickness error with reference to the magnitude of an output from the sensor and to correct spherical aberration based on a result of the detection.

16 Claims, 16 Drawing Sheets

SYSTEM FOR GENERATING DETECTION SIGNAL TO BE SUPPLIED TO LIQUID CRYSTAL ELEMENT DRIVE CIRCUIT

SYSTEM FOR GENERATING DETECTION SIGNAL TO BE SUPPLIED TO SERVO CIRCUIT AND REPRODUCTION CIRCUIT

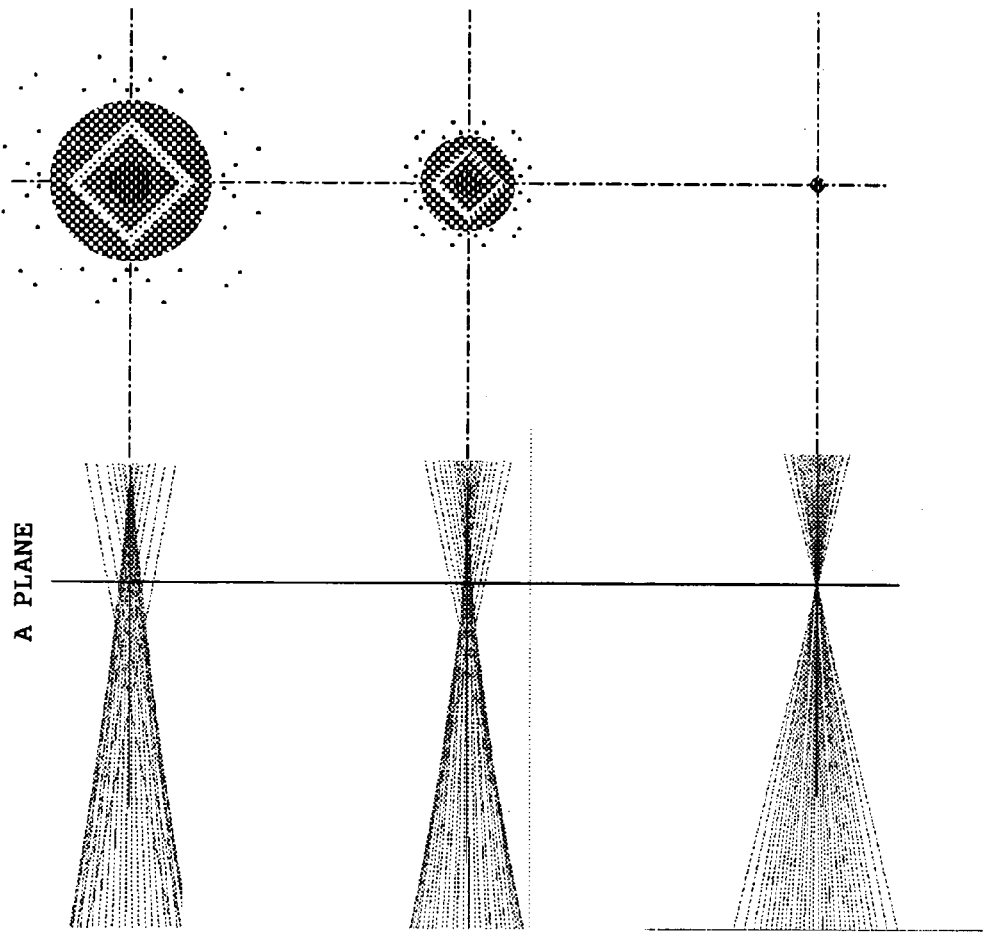

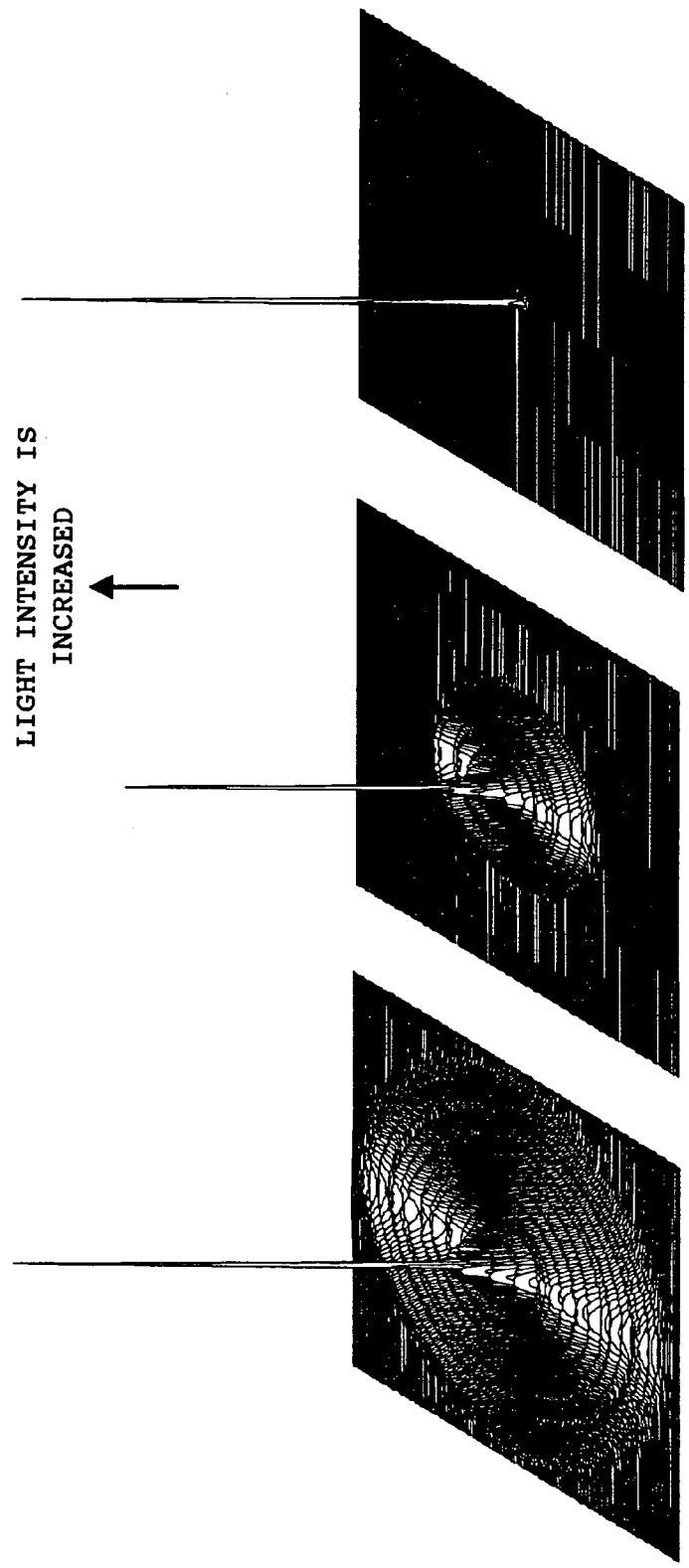
FIG. 6 DISTRIBUTION OF LIGHT INTENSITY ON SENSOR (A PLANE)
FIG. 6A CASE WHERE PROTECTIVE LAYER IS THIN
FIG. 6B CASE WHERE PROTECTIVE LAYER IS OPTIMUM IN THICKNESS
FIG. 6C CASE WHERE PROTECTIVE LAYER IS THICK
LIGHT INTENSITY IS INCREASED

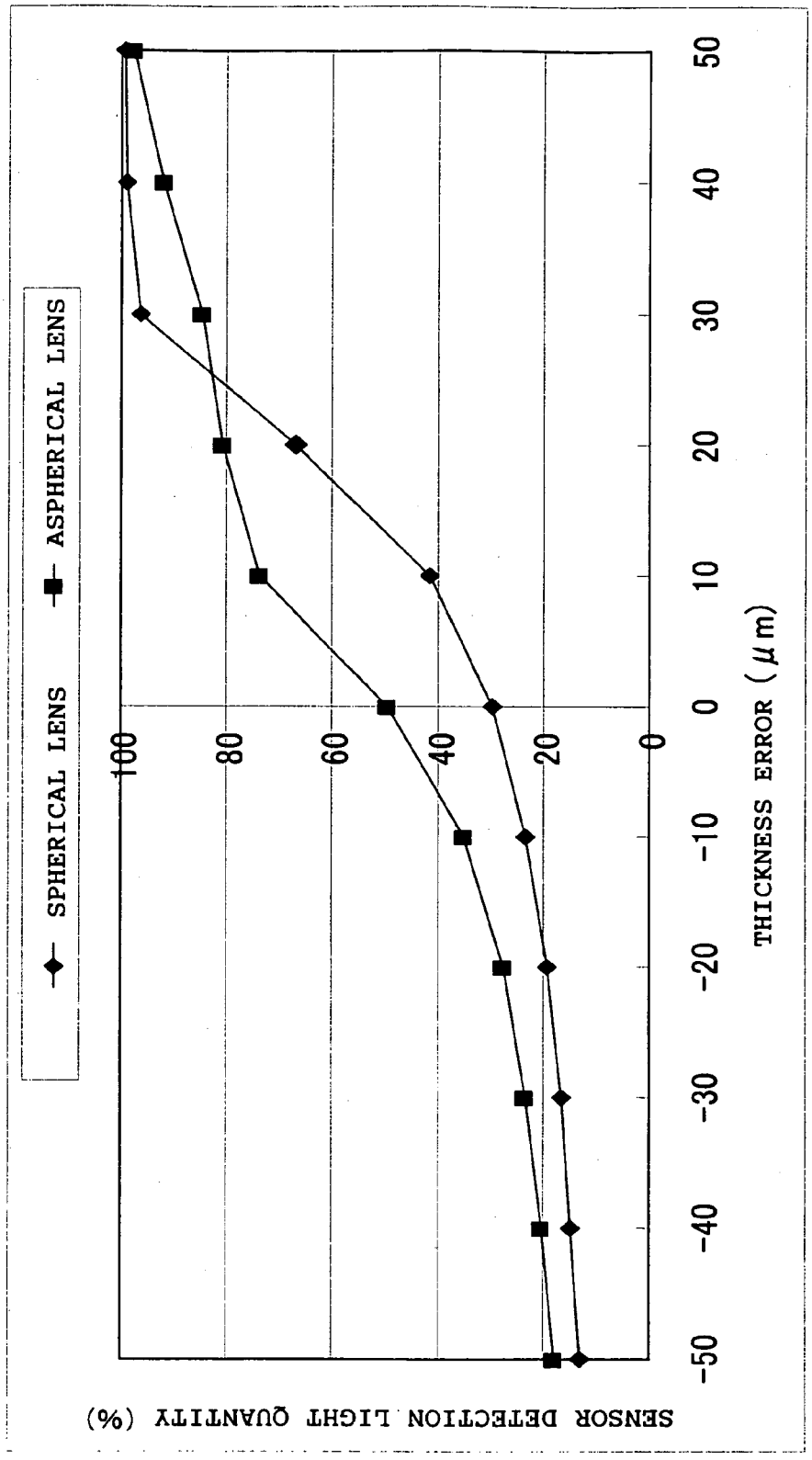
FIG.7 CHANGES IN DETECTION SIGNAL IN ACCORDANCE WITH THICKNESS

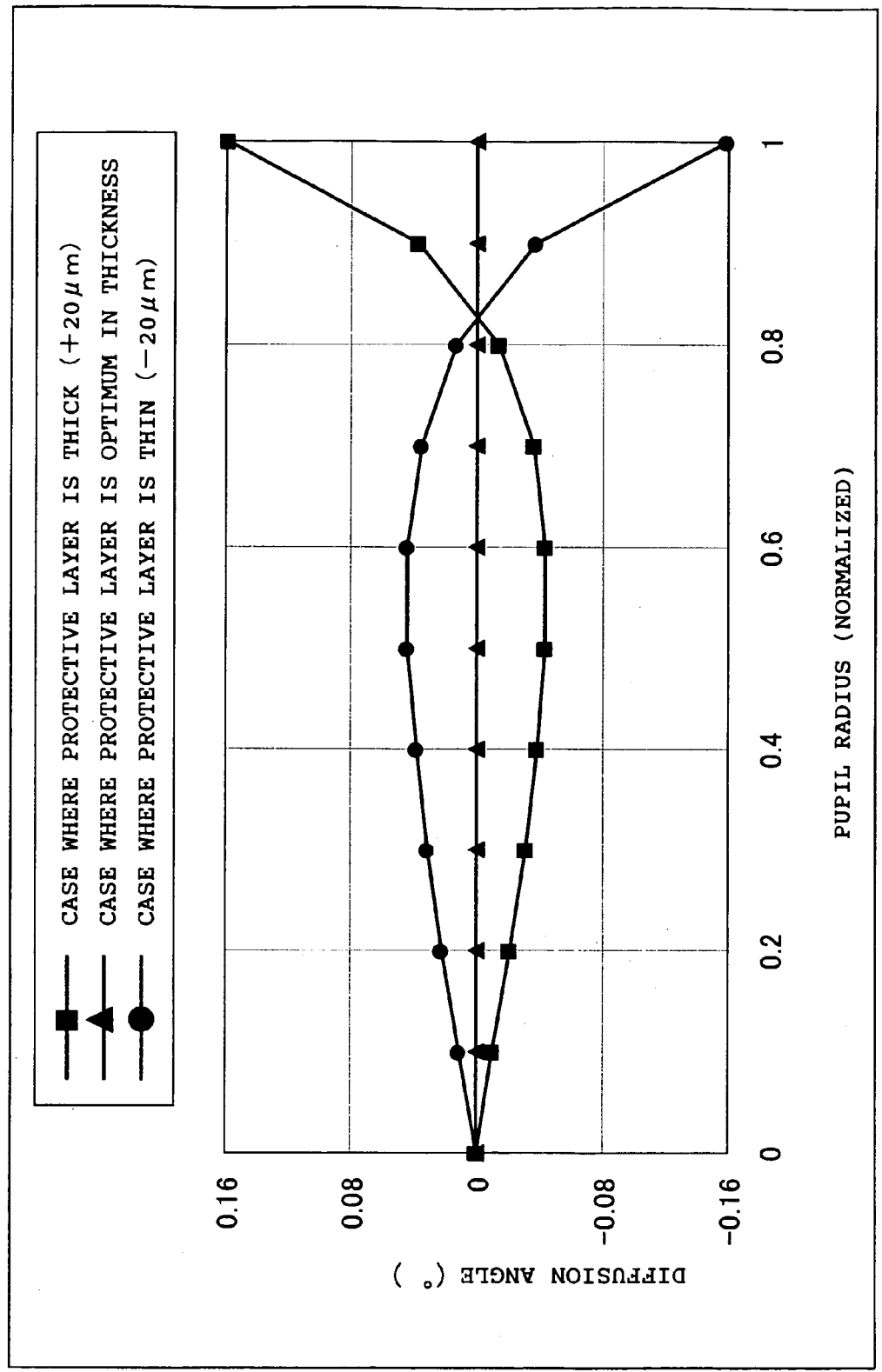
FIG.8 DISTRIBUTION OF DIFFUSION ANGLE OF RETURNING LIGHT (DUE TO THICKNESS ERROR)

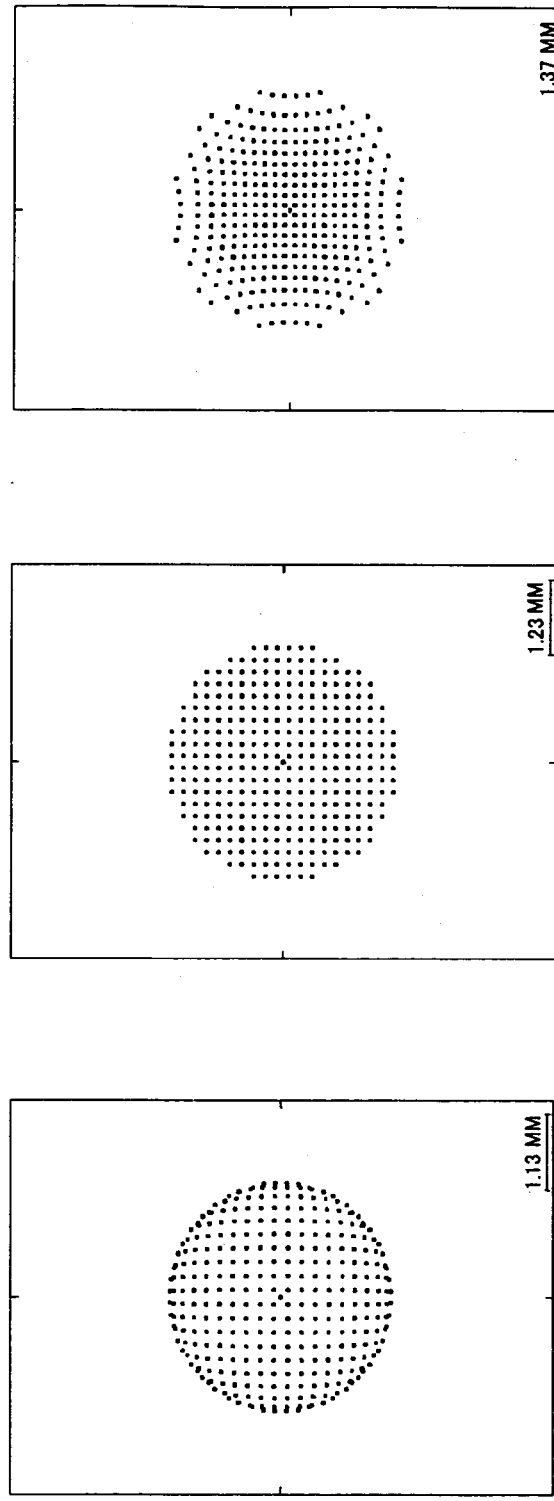

LIGHT BEAM INCIDENT ON SENSOR (A PLANE)   CROSS-SECTIONAL VIEW OF LIGHT BEAM ON SENSOR (A PLANE)

FIG. 10A
CASE WHERE PROTECTIVE LAYER IS THIN

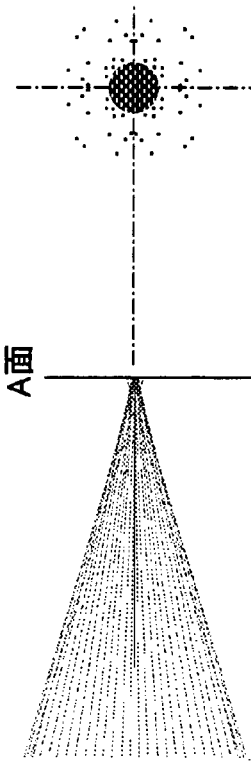

FOCAL POINT OF INNER PERIPHERAL LIGHT BEAM IS DISPLACED TO THE RIGHT AND FOCAL POINT OF OUTER PERIPHERAL LIGHT BEAM IS DISPLACED TO THE LEFT

FIG. 10B
CASE WHERE PROTECTIVE LAYER IS OPTIMUM IN THICKNESS

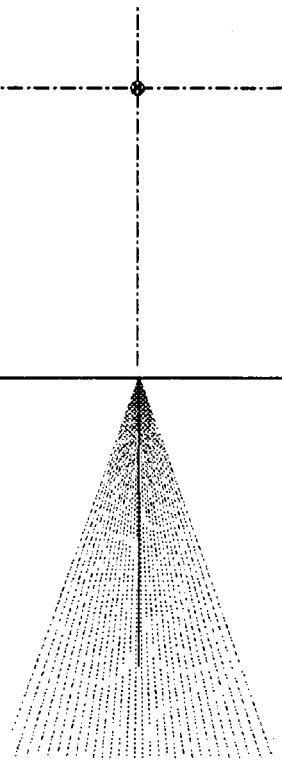

FOCAL POINT OF INNER PERIPHERAL LIGHT BEAM AND FOCAL POINT OF OUTER PERIPHERAL LIGHT BEAM COINCIDE WITH EACH OTHER

FIG. 10C
CASE WHERE PROTECTIVE LAYER IS THICK

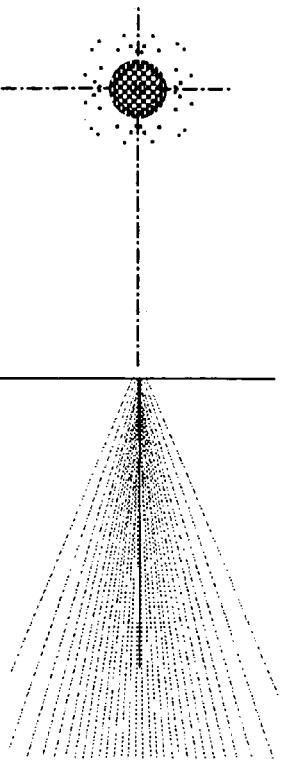

FOCAL POINT OF INNER PERIPHERAL LIGHT BEAM IS DISPLACED TO THE LEFT AND FOCAL POINT OF OUTER PERIPHERAL LIGHT BEAM IS DISPLACED TO THE RIGHT

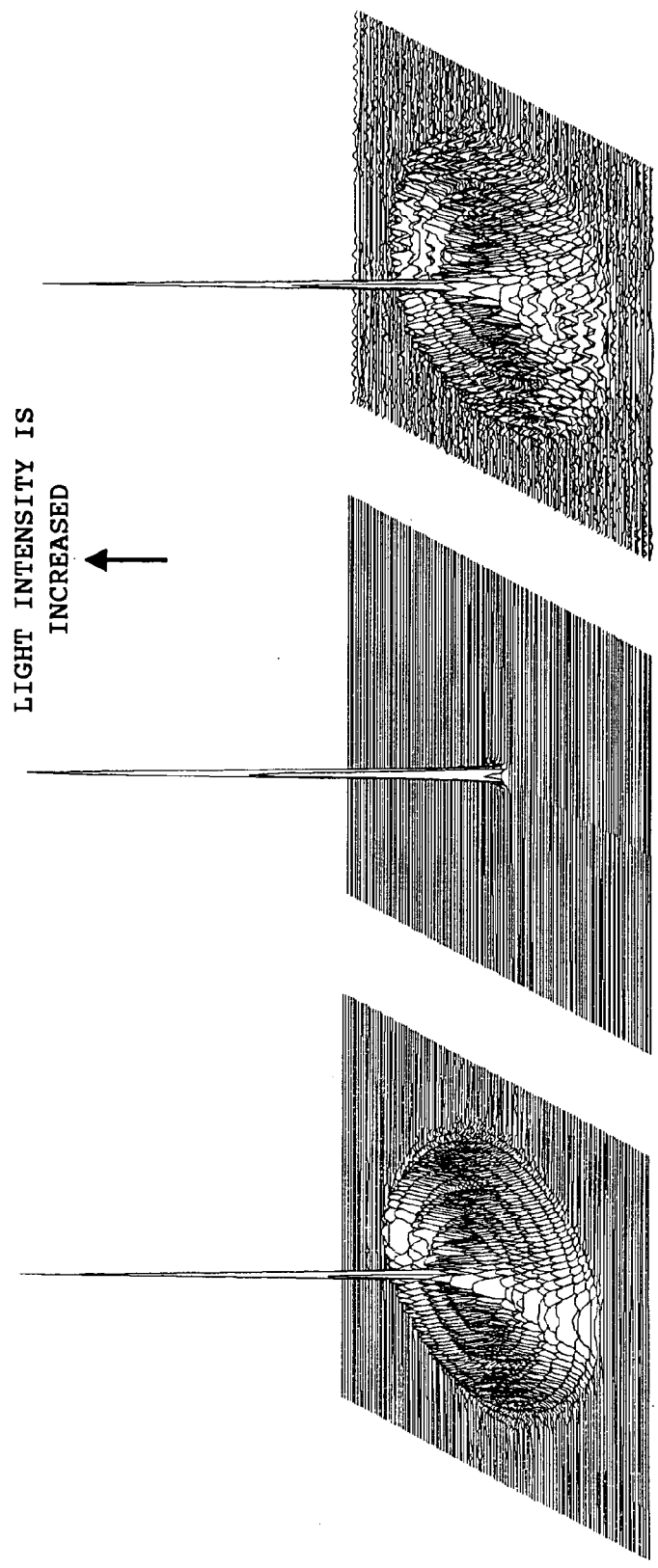
FIG. 11 DISTRIBUTION OF LIGHT INTENSITY ON SENSOR (A PLANE)
FIG. 11A CASE WHERE PROTECTIVE LAYER IS THIN
FIG. 11B CASE WHERE PROTECTIVE LAYER IS OPTIMUM IN THICKNESS
FIG. 11C CASE WHERE PROTECTIVE LAYER IS THICK

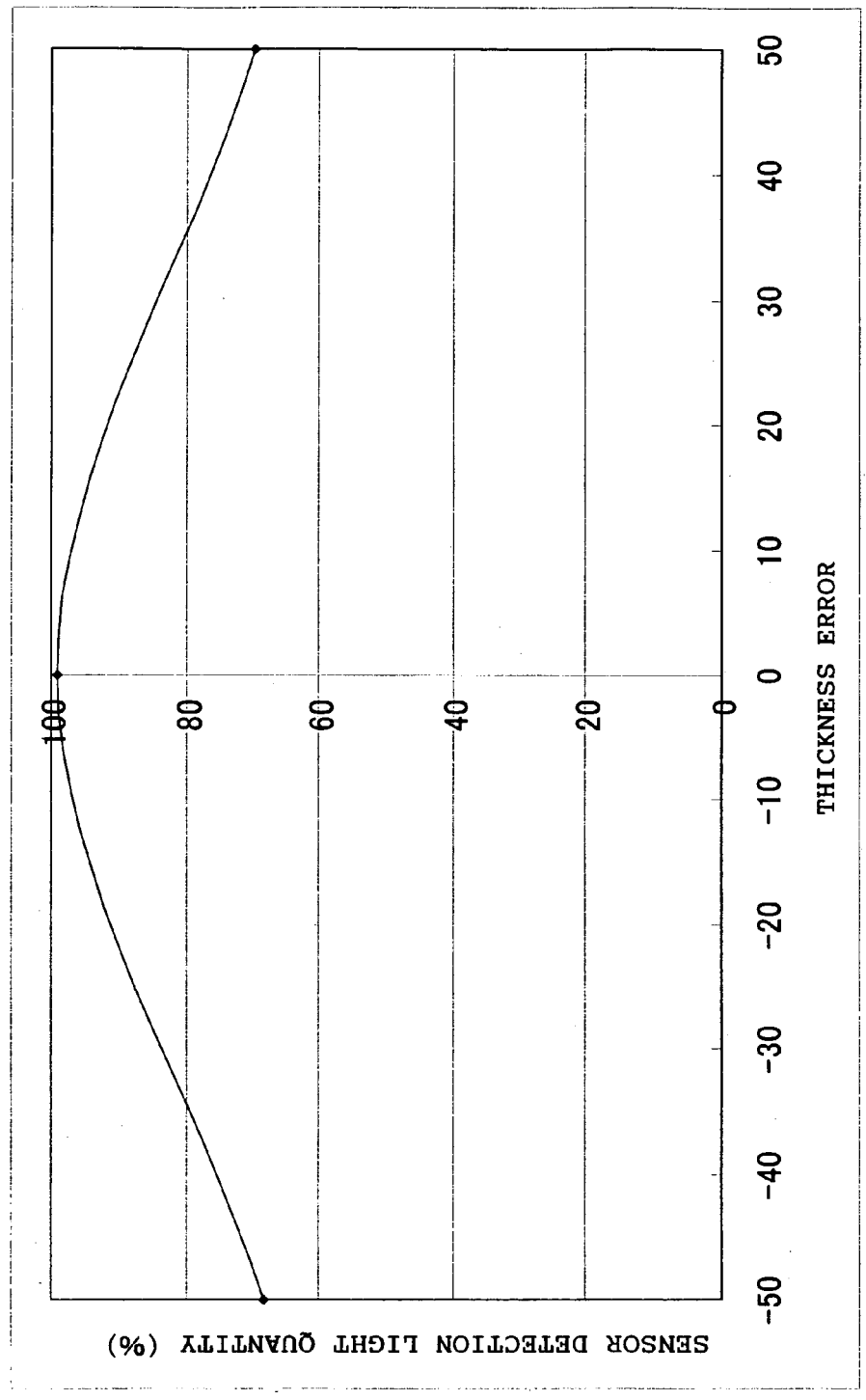
FIG.12 CHANGES IN DETECTION SIGNAL IN ACCORDANCE WITH THICKNESS

OPTICAL PICKUP DEVICE AND RECORDING AND/OR REPRODUCING DEVICE

BACKGROUND OF THE INVENTION

1. Field of the Invention

The present invention relates to an optical pickup device and a recording and/or reproducing device, and more particularly to an optical pickup device and a recording and/or reproducing device that are capable of suitably correcting spherical aberration resulting from a thickness error of an intermediate layer (such as a protective layer) existing between a disk surface and a recording layer.

2. Description of the Related Art

It is possible to increase the recording density of an optical disk by shortening the wavelength of laser light or increasing a numerical aperture of an objective lens. If the numerical aperture of an objective lens is increased, however, spherical aberration occurs in laser light due to a thickness error of a protective layer existing between a disk surface and a recording layer.

When the thickness of the protective layer is set to around 0.1 mm, for instance, the thickness error is around ±10 to 20 im. If spherical aberration occurs in laser light converged on a recording layer due to the thickness error, the recording/reproduction characteristics with respect to the recording layer are degraded. Therefore, when an objective lens having a high numerical aperture is used, it is required to additionally provide means for detecting and correcting the spherical aberration.

It is possible to detect such spherical aberration by monitoring reflection light (returning light) from the disk.

In usual cases, laser light from a semiconductor laser is converted into parallel light by a collimator lens and then converged on a recording layer by an objective lens. Here, the objective lens is designed such that when the thickness of the protective layer is appropriate, the laser light is condensed on the recording layer.

When the thickness of the protective layer is appropriate, returning light from the recording layer is converted into parallel light while passing through the objective lens. If there exists a thickness error of the protective layer, however, the returning light having passed through the objective lens does not become parallel light and light beams in the center region of the returning light, and light beams in the outer peripheral region thereof are diffused or converged. By detecting the degree of the diffusion, it is possible to detect the degree of the thickness error or the spherical aberration.

FIG. 8 shows results of simulation of how diffusion angles of returning light (in the case of a perfect circle beam) are distributed. As shown in FIG. 8, when the thickness of the protective layer assumes an optimum value, the returning light is converted into parallel light in both of its center region and outer peripheral region. In contrast to this, when the thickness of the protective layer is greater than the optimum value, the returning light is converged in its center region (pupil radius=0 to around 0.8) and is diffused in its outer peripheral region (pupil radius=around 0.8 to 1). Conversely, when the thickness of the protective layer is smaller than the optimum value, the returning light is diffused in its center region and is converged in its outer peripheral region.

As a result of this phenomenon, light beams of the returning light are distributed in the manner shown in FIGS. 9A to 9C. That is, when the thickness of the protective layer assumes the optimum value (see FIG. 9B), the light beams of the returning light are uniformly distributed in its cross section. In contrast to this, when the thickness of the protective layer is greater than the optimum value (see FIG. 9C), more light beams of the returning light are distributed in the center region than in the outer peripheral region. Also, when the thickness of the protective layer is smaller than the optimum value (see FIG. 9A), more light beams of the returning light are distributed in the outer peripheral region than in the center region.

Therefore, by detecting the distribution state of the light beams using a photodetector element (photosensor), it is possible to detect the degree of the thickness error or the spherical aberration. However, the following problem occurs due to a difference in focus position between the light beams in the inner peripheral region and the light beams in the outer peripheral region (refer to the description of FIGS. 10A and 10C). As shown in FIGS. 10A to 10C, if setting has been made such that returning light is converged on the photosensor (A plane) by a convergence lens when the thickness of the protective layer is optimum, for instance, the distribution of light intensity on the sensor is uniformly changed when the thickness of the protective layer becomes greater or smaller than the optimum value (see FIGS. 11A to 11C). Therefore, it is impossible to reflect the direction and degree of the thickness error in an output signal of the photosensor (see FIG. 12).

In view of this problem, JP 2001-507463 A discloses an optical pickup with which returning light is split by a beam splitter into light beams in a center region and light beams in an outer peripheral region, and the split light beams are respectively received by a pair of photosensors.

According to this conventional technique, however, it is required to provide a beam splitter for splitting the returning light and a pair of photosensors for receiving light beams generated by the beam splitter, which leads to a problem in that it becomes necessary to provide many additional optical components to detect spherical aberration. Also, it is required to arrange the photosensors on a beam splitting path, so that it becomes necessary to secure a space for arranging the photosensors and a space for securing the beam splitting path. This causes another problem in that the outer dimensions of a pickup device main body is increased.

SUMMARY OF THE INVENTION

In view of the above-mentioned problems, the present invention has been made to provide an optical pickup device, which is capable of performing detection and correction of spherical aberration while suppressing an increase in the number of construction elements and without increasing the outer dimensions of a pickup device main body, and a recording and/or reproducing device having the optical pickup device built therein.

A primary aspect of the present invention can be grasped as an optical pickup for performing recording and/or reproduction of information by irradiating laser light onto a disk. The optical pickup includes: detection means for detecting spherical aberration resulting from a thickness error of an intermediate layer existing between a disk surface and a recording layer; and correction means for correcting the spherical aberration detected by the detection means. Further, the detection means includes: a lens designed to converge reflection light from the disk when a thickness of the intermediate layer is greater or smaller than an optimum value by a predetermined degree; and a photodetector that receives the reflection light converged by the lens to output an electric signal, and when the thickness of the intermediate layer assumes the optimum value, receives a predetermined proportion of the reflection light with reference to a total light quantity of the reflection light. The correction means includes a diffusion angle converter that changes a diffusion angle of the laser light traveling toward the disk in accordance with a servo signal generated from the electric signal outputted from the photodetector.

In the above-mentioned aspect, the lens is preferably constructed using an aspherical lens that condenses the reflection light at an almost single point when the thickness of the intermediate layer is greater or smaller than the optimum value by the predetermined degree. Alternatively, the lens may be constructed using a spherical lens designed to set spherical aberration of the reflection light to be close to a minimum value when the thickness of the intermediate layer is greater or smaller than the optimum value by the predetermined degree.

Further, in the above-mentioned aspect, the photodetector is constructed using at least one photosensor, with a shape and arrangement of the photosensor being adjusted to receive around half a total light quantity of the reflection light converged by the lens when the thickness of the intermediate layer assumes the optimum value.

Further, in the above-mentioned aspect, the lens can be constructed such that one of its lens surfaces is formed to have a spherical or aspherical shape with which the reflection light is condensed when the thickness of the intermediate layer is greater or smaller than the optimum value by the predetermined degree, and the other lens surface is formed to have a cylindrical shape with which an astigmatic action is introduced into the reflection light. At this time, the photodetector can be constructed so as to include: a photosensor portion that receives around half a total light quantity of the reflection light converged by the lens when the thickness of the intermediate layer assumes the optimum value; and four light-receiving regions for generating a focus error signal from the reflection light into which the astigmatic action is introduced. Here, the four light-receiving regions has a photosensor portion in which when the laser light is appropriately condensed with respect to the recording layer, the reflection light from the disk is uniformly received by the four light-receiving regions, and when condensing displacement occurs with respect to the recording layer, a quantity of the reflection light received by any one of two pairs of light-receiving regions located in diagonal line directions becomes larger than a quantity of the reflection light received by the other pair of light-receiving regions.

Further, another aspect of the present invention may be grasped as a recording and/or reproducing device including: an optical pickup that performs recording and/or reproduction of information by irradiating laser light onto a disk; and a servo circuit that applies a servo signal to the optical pickup. Here, the optical pickup includes: detection means for detecting spherical aberration resulting from a thickness error of an intermediate layer existing between a disk surface and a recording layer; and correction means for correcting the spherical aberration detected by the detection means, and the servo circuit includes a drive circuit that drives the correction means in accordance with a result of the detection by the detection means. Also, the detection means includes: a lens designed to converge reflection light from the disk when a thickness of the intermediate layer is greater or smaller than an optimum value by a predetermined degree; and a photodetector that receives the reflection light converged by the lens to output an electric signal, and when the thickness of the intermediate layer assumes the optimum value, receives a predetermined portion of the reflection light with reference to a total light quantity of the reflection light. The drive circuit generates the servo signal for correcting the spherical aberration from the electric signal outputted from the photodetector. The correction means includes a diffusion angle converter that changes a diffusion angle of the laser light traveling toward the disk in accordance with the servo signal from the drive circuit.

The above and other objects and novel features of the present invention will become apparent more completely by contemplating the following description of embodiments to be made with reference to the accompanying drawings. However, the following embodiments each show an exemplification of the present invention to the end and do not limit the scope of the present invention.

BRIEF DESCRIPTION OF THE DRAWINGS

In the accompanying drawings:

FIGS. 5A to 5C each show a condensing state of returning light according to the first embodiment;

FIGS. 6A to 6C each show an intensity distribution of returning light according to the first embodiment;

FIG. 7 shows a relationship between a thickness error and the quantity of light received by a sensor according to the first embodiment;

FIG. 8 shows a relationship between a thickness error and the diffusion angle of returning light;

FIGS. 9A to 9C each show a relationship between a thickness error and a light beam distribution of returning light according to a conventional example;

FIGS. 10A to 10C each show a condensing state of returning light according to the conventional example;

FIGS. 11A to 11C each show an intensity distribution of returning light according to the conventional example;

FIG. 12 shows a relationship between a thickness error and a quantity of light received by a sensor according to the conventional example;

DETAILED DESCRIPTION OF THE PREFERRED EMBODIMENTS

Embodiments of the present invention will hereinafter be described with reference to the accompanying drawings.

<First Embodiment>

Figure 1:
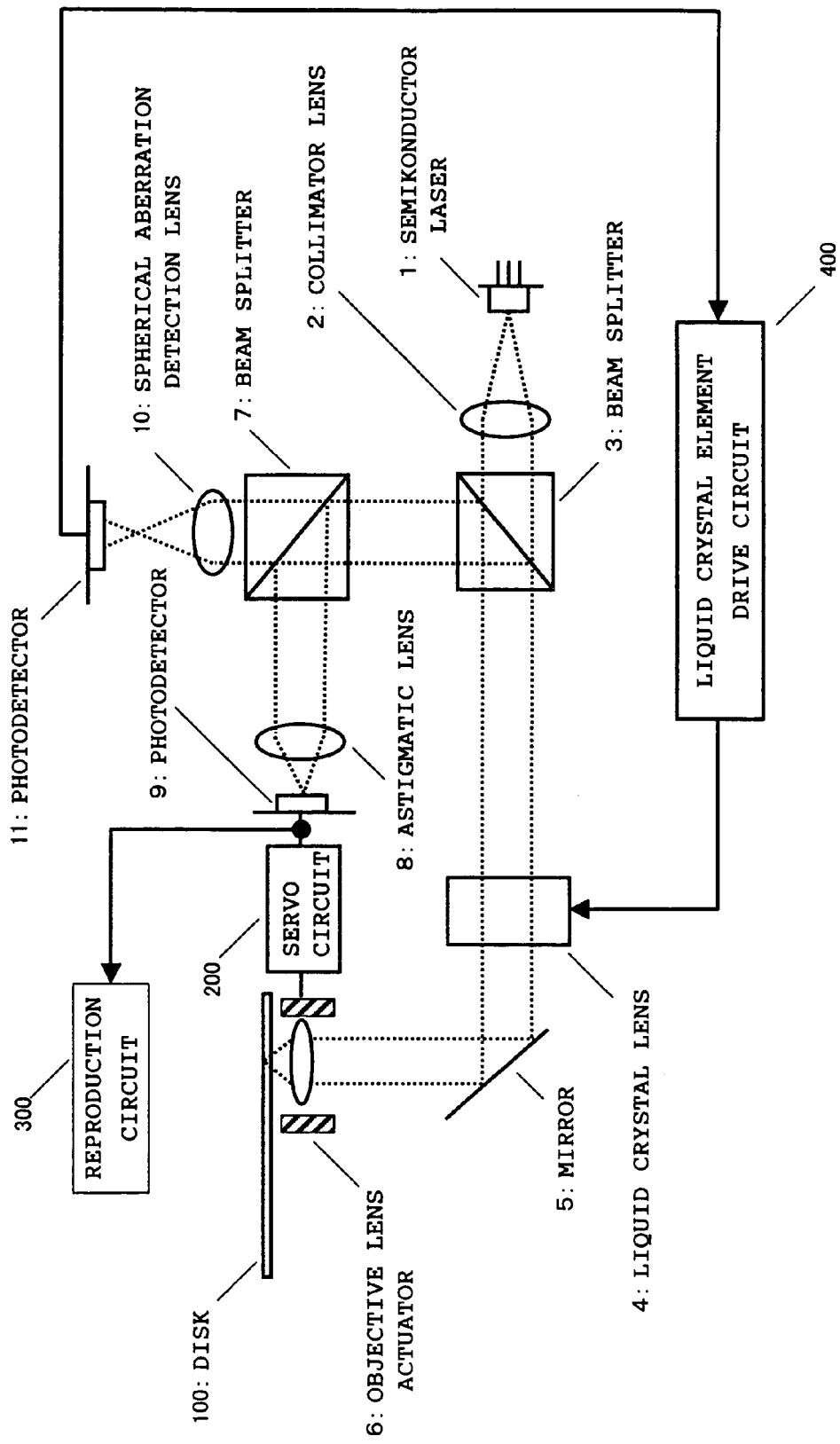
FIG. 1 shows a construction of an optical pickup device according to a first embodiment and a construction of an optical disk device having the optical pickup device built therein.

FIG. 1 shows a construction of an optical pickup device according to a first embodiment and a construction of an optical disk device having the optical pickup device built therein.

As shown in this drawing, the optical pickup device includes a semiconductor laser 1, a collimator lens 2, a beam splitter 3, a liquid crystal lens 4, a mirror 5, an objective lens drive actuator 6, a beam splitter 7, an astigmatic lens 8, a photodetector 9, a spherical aberration detection lens 10, and a spherical aberration detection photodetector 11.

Laser light emitted from the semiconductor laser 1 is converted into parallel light by the collimator lens 2. After passing through the beam splitter 3, the resultant laser light is made incident on the liquid crystal lens 4, which then diffuses or converges the incident laser light in accordance with a drive signal from a liquid crystal element drive circuit 400. The laser light, whose diffusion degree has been adjusted in this manner, is reflected by the mirror 5 and is condensed on a recording layer of a disk 100 by the objective lens drive actuator 6.

Here, the objective lens drive actuator 6 drives an objective lens in a focus direction and a tracking direction in accordance with a servo signal from a servo circuit 200 (to be described below). As a result of this operation, a condensing point of the laser light on the recording layer follows tracks on the disk.

It should be noted here that the liquid crystal lens 4 is used to correct spherical aberration resulting from a thickness error of a protective layer of the disk 100. That is, the diffusion degree of the laser light is adjusted by this liquid crystal lens 4, thereby correcting spherical aberration of the laser light on the recording layer.

Figure 2:
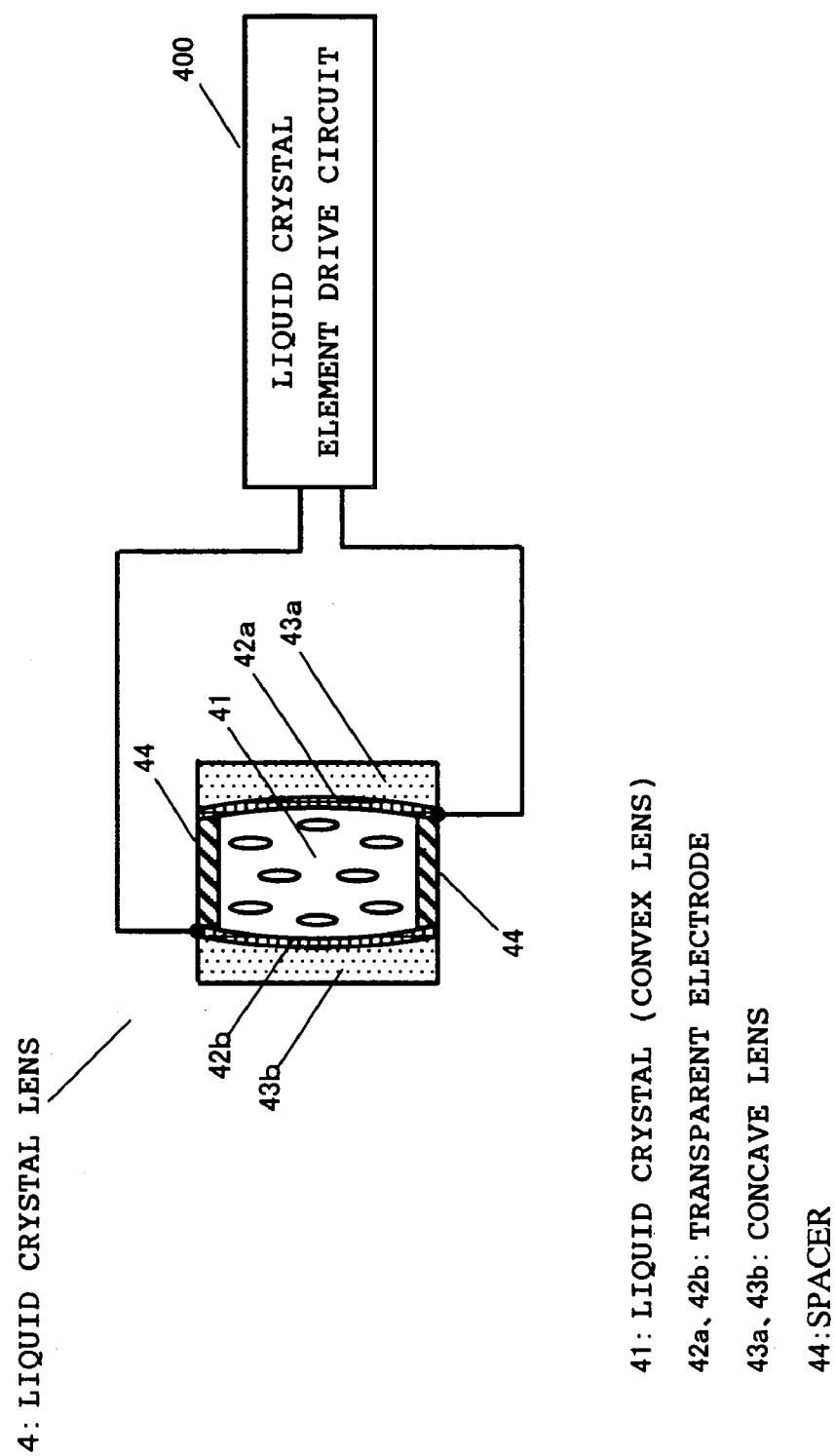
FIG. 2 shows a construction of a liquid crystal lens according to the first embodiment.

FIG. 2 shows a construction of the liquid crystal lens 4. As shown in this drawing, the liquid crystal lens 4 is constructed by providing transparent electrodes 42a and 42b and a liquid crystal 41 between two spherical concave lenses 43a and 43b. Note that reference numeral 44 denotes an insulation spacer. Here, the refractive index of the liquid crystal 41 changes in accordance with voltages applied from the transparent electrodes 42a and 42b. That is, when voltages are applied to the transparent electrodes 42a and 42b, the orientation state of the liquid crystal changes in accordance with the magnitudes of the voltages, which results in changing the refractive index of the liquid crystal. Consequently, it is possible to adjust the condensing action of the liquid crystal by changing the voltages applied to the transparent electrodes 42a and 42b. Note that the changing of the refractive index of the liquid crystal in accordance with the applied voltages is, for instance, described in "Liquid Crystal High Polymer (see page 245)" published by Sigma Corporation on Feb. 8, 1988.

The refractive angle of light passing through the liquid crystal lens 4 in a right-left direction on the paper plane of FIG. 2 is determined by a difference in refractive index between the concave lenses 42a and 42b and the liquid crystal (convex lens). Therefore, it is possible to adjust the diffusion/convergence degree of the light by changing the voltages applied to the transparent electrodes 42a and 42b.

Figure 3:
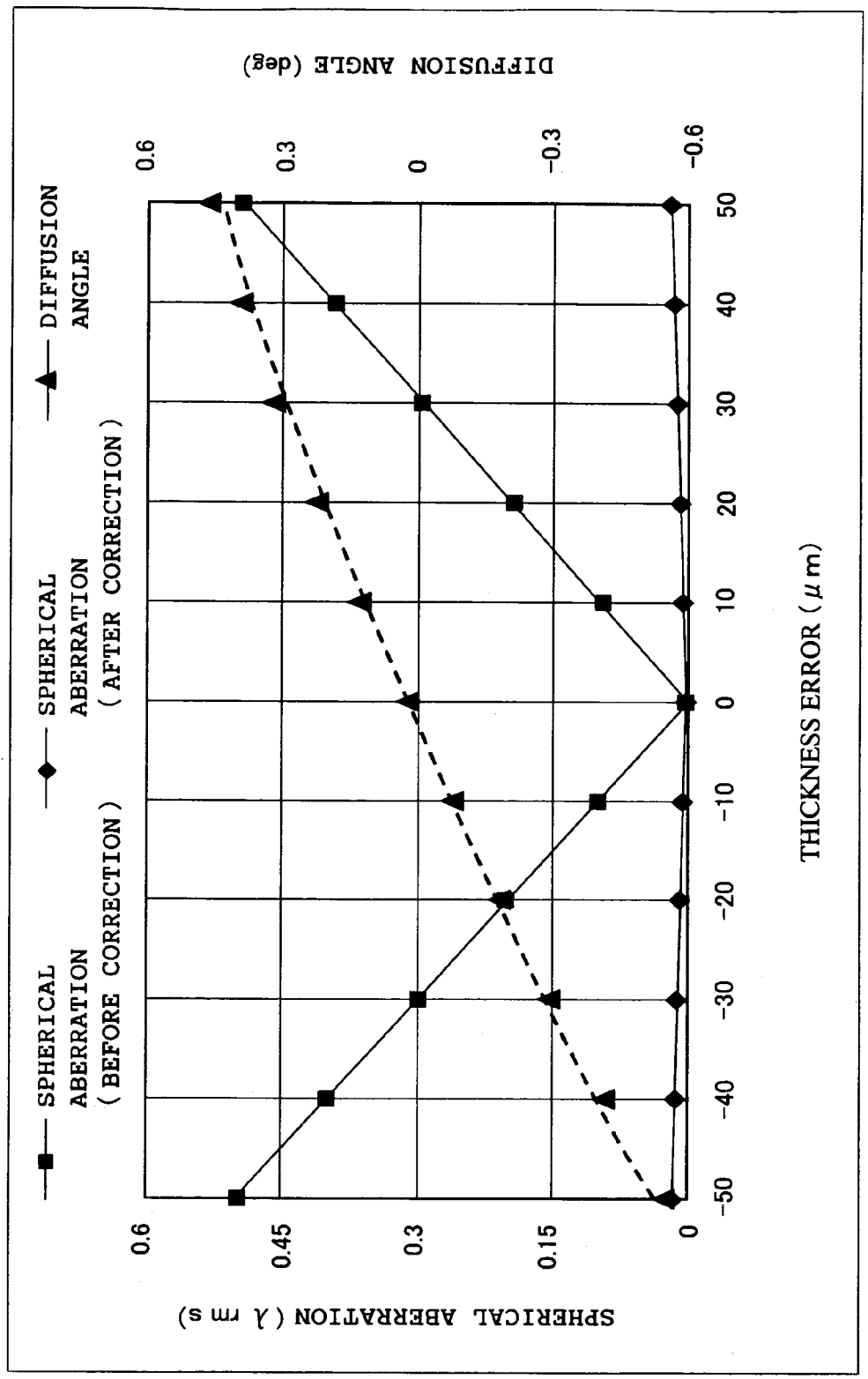
FIG. 3 shows relationships among a thickness error, spherical aberration, and a diffusion angle.

FIG. 3 shows a result of simulation of a relationship between the thickness error of the disk protective layer and the spherical aberration occurring in the laser light on the recording layer. FIG. 3 also shows a relationship between a diffusion angle given by the liquid crystal lens 4 and the spherical aberration corrected with the given diffusion angle.

When the diffusion angle of the laser light is not adjusted (in the case of parallel laser light), the spherical aberration is increased in proportion to the degree of the thickness error (see a graph indicated with the mark " " in FIG. 3). In contrast to this, when the diffusion angle of the laser light is adjusted in accordance with the direction and degree of the thickness error (see a graph indicated with the mark " " in FIG. 3), the spherical aberration is corrected to a value that is close to zero (see a graph indicated with the mark " " in FIG. 3).

The liquid crystal element drive circuit 400 detects the direction and degree of the thickness error using an output signal from the photodetector 11 and controls the liquid crystal lens 4 based on the characteristics shown in FIG. 3 (see the graph indicated with the mark " " in FIG. 3). As a result of this operation, the liquid crystal lens 4 gives the laser light a diffusion angle with which the spherical aberration resulting from the thickness error is corrected.

Referring again to FIG. 1, the reflection light (returning light) from the disk 100 travels back in the optical path described above. Then, a part of the reflection light is reflected by the beam splitter 3 and is further split by the beam splitter 7 into two separate beams, one of which is converged on the photodetector 9 through the astigmatic lens 8. Note that this astigmatic lens 8 is, for instance, produced by combining a convergence lens and a cylindrical lens.

Signals from the photodetector 9 are supplied to each of the servo circuit 200 and a reproduction circuit 300, which then generate various servo signals and reproduction RF signals from the supplied signals.

Figure 4B:
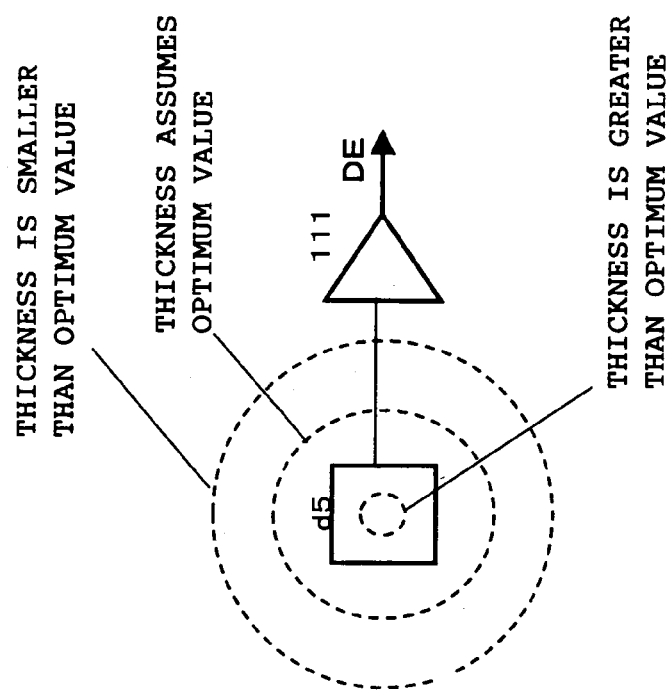
FIGS. 4A and 4B each show a construction of a photodetector and a construction of its arithmetic circuit according to the first embodiment.
Figure 4A:
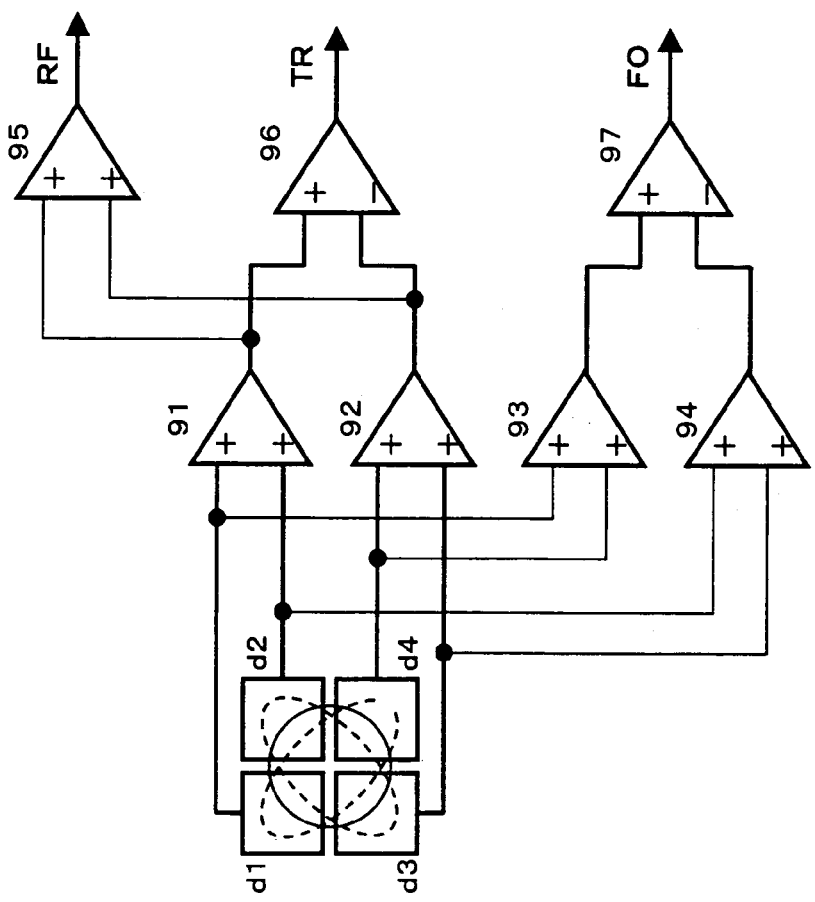

FIG. 4A shows a construction of the photodetector 9 and a construction of an arithmetic circuit for performing an arithmetic operation on output signals from the photodetector 9.

The photodetector 9 is constructed using four photosensors d1 to d4. Here, the photodetector 9 is constructed so that when laser light properly follows recording tracks on the disk, the recording tracks are projected onto a division line between (i) the sensors d1 and d2 and (ii) the sensors d3 and d4. Consequently, by performing subtraction on a signal obtained by performing addition on the outputs of the sensors d1 and d2 (output signal of an addition circuit 91) and a signal obtained by performing addition on the outputs of the sensors d3 and d4 (output signal of an addition circuit 92) using a subtraction circuit 96, a tracking error signal (TR) is generated.

Also, when the laser light is correctly condensed on the disk recording layer, the returning light converged by the astigmatic lens 8 forms a perfect circle spot at the center of the photodetector 9. On the other hand, when the condensing point of the laser light is displaced frontward or backward with reference to the recording layer, the spot on the photodetector 9 becomes an oval spot where the quantity of light incident on a pair of the light sensors d1 and 4d or on a pair of the light sensors d2 and d3 becomes larger than the quantity of light incident on the remaining pair of the sensors. As a result, by performing subtraction on a signal obtained by performing addition on the outputs from the sensors d1 and d4 (output signal of an addition circuit 93) and a signal obtained by performing addition on the outputs from the sensors d2 and d3 (output signal of an addition circuit 94) using a subtraction circuit 97, a focus error signal (FO) is generated.

Further, by summing up all of the output signals from the sensors d1 to d4 using the addition circuits 91 and 92 and an addition circuit 95, a reproduction RF signal (RF) is generated.

The servo circuit 200 generates a focus servo signal and a tracking servo signal from the tracking error signal (TR) and the focus error signal (FO) described above and supplies the generated signals to the objective lens drive actuator 6. Also, the reproduction circuit 300 generates reproduction data by processing the reproduction RF signal.

Referring again to FIG. 1, a part of the returning light from the disk 100 passes through the beam splitter 7 and is condensed on the photodetector 11 by the spherical aberration detection lens 10. Here, the spherical aberration detection lens 10 and the photodetector 11 are designed and arranged so that it is possible to detect the direction and degree of the thickness error of the disk protective layer. Note that the construction and arrangement of the spherical aberration detection lens 10 and the photodetector 11 will be described in detail below.

A detection signal from the photodetector 11 is supplied to the liquid crystal element drive circuit 400 on an optical disk device side. The liquid crystal element drive circuit 400 detects the thickness error of the disk protective layer using the supplied detection signal and changes the refractive index of the liquid crystal lens 4 in the manner described above with reference to FIG. 3. As a result of this operation, the laser light from the semiconductor laser 1 is diffused or converged and spherical aberration of the laser light on the recording layer is corrected.

Next, the construction and arrangement of the spherical aberration detection lens 10 and the photodetector 11 will be described. FIGS. 5A to 5C each show a state of returning light converged by the spherical aberration detection lens 10 on the photodetector 11.

As shown in these drawings, when the thickness of the disk protective layer is greater than the optimum value, the returning light from the disk is condensed on a sensor surface. That is, the spherical aberration detection lens 10 is designed such that when the thickness of the disk protective layer is greater than the optimum value (see FIG. 5C), the returning light is condensed on the sensor surface of the photodetector 11 (on an A plane in the drawing).

Here, it is possible to construct the spherical aberration detection lens 10 using an aspherical lens designed so as to correct the spherical aberration of the returning light. By adopting such an aspherical lens, when the thickness of the disk protective layer is greater than the optimum value (see FIG. 5C), all light beams of the returning light from the disk are condensed on the sensor surface (A plane).

In contrast to this, it is also possible to construct the spherical aberration detection lens 10 using a spherical lens instead of the aspherical lens. In this case, it is required that the radius of curvature of the spherical lens is adjusted so that the spherical aberration of the returning light is minimized. That is, the radius of curvature of the spherical lens is set to a value at which a distance between a condensing point of the returning light at the most frontward position and a condensing point thereof at the most distant position assumes the minimum value. With this construction, it becomes possible to minimize the condensing spot of the returning light on the sensor surface (A plane).

In this construction, if the thickness of the disk protective layer is reduced from the thickness shown in FIG. 5C, the distribution of the light beams on the sensor surface (A plane) is gradually increased as shown in FIGS. 5B and 5A. In accordance with this increase in the light beam distribution, the intensity of the returning light on the sensor surface (A plane) changes from a state shown in FIG. 6C to a state shown in FIG. 6B and then to a state shown in FIG. 6A.

The sensor of the photodetector 11 is constructed and arranged so that when the thickness of the disk protective layer assumes the optimum value under this intensity changing, around 50% of all light beams of the returning light is received. With this construction, it becomes possible to change the quantity of light received by the sensor in accordance with the degree of the thickness error.

FIG. 7 shows a relationship (simulation result) between the thickness error of the disk protective layer and the quantity of light received by the sensor (sensor reception light quantity/returning light). In this drawing, a case where an aspherical lens is used as the spherical aberration detection lens 10 and a case where a spherical lens is used as the spherical aberration detection lens 10 are both shown. Note that when the aspherical lens is used, the sensor of the photodetector 11 is set so that when the thickness of the disk protective layer assumes the optimum value, 50% of all light beams is received. In contrast to this, when the spherical lens is used, the sensor of the photodetector 11 is set so that when the thickness of the disk protective layer assumes the optimum value, 30% of all light beams is received.

FIG. 4B shows a relationship between a sensor of the photodetector 11 and a convergence spot of the returning light.

As shown in this drawing, the photodetector 11 is composed of a single sensor d5. This sensor d5 is arranged so that the optical axis of the returning light perpendicularly goes through the center of the sensor d5. The sensor d5 is also formed so that when the thickness of the disk protective layer assumes the optimum value, around 50% of all light beams of the returning light is received. Also, an output signal from the sensor d5 is amplified by an amplifier 111. With this construction, an electric signal (DE) corresponding to fluctuations in the thickness can be generated.

The liquid crystal drive circuit 400 generates an electric signal corresponding to the direction and degree of the thickness error by subtracting this electric signal (DE) from a reference value (electric signal (DE) in the case where the thickness of the protective layer is appropriate). The polarity of the electric signal indicates the direction of the thickness error and the magnitude (absolute value) of the electric signal expresses the degree of the thickness error. The liquid crystal element drive circuit 400 controls the liquid crystal lens 4 as described above with reference to this electric signal. As a result of this operation, the diffusion degree of the laser light is adjusted, and therefore the spherical aberration of the laser light on the recording layer is corrected.

As described above, in this embodiment, the constructions and arrangement of the spherical aberration detection lens 10 and the photodetector 11 are adjusted so that it is possible to detect the thickness error of the disk protective layer without splitting the returning light from the disk. As a result, when compared with the conventional construction described above, it becomes possible to simplify the construction, to suppress the number of construction elements, and to miniaturize the pickup main body.

It should be noted here that the present invention is not limited to this embodiment and it is of course possible to make various changes and modifications.

For instance, in this embodiment, the diffusion degree of laser light is adjusted using the liquid crystal lens 4. Instead of this construction, however, it is possible to adjust the diffusion degree of the laser light by changing a distance between the convex lens and the concave lens using an actuator, for instance.

Also, the optical system of the optical pickup device described above is capable of being suitably applied to a compact disk player, a DVD player, and the like. Aside from these, it is also possible to apply the present invention to an optical pickup device applied to another optical disk device of a playback-only type or a recordable type such as a magneto-optical disk recording/reproducing device, for instance.

Further, in the first embodiment described above, design has been made so that when the thickness of the disk protective layer becomes maximum, the returning light is condensed on the sensor surface. This design, however, may be changed so that when the thickness of the disk protective layer becomes minimum, the returning light is condensed on the sensor surface. In this case, the cross section of the returning light on the sensor surface (A plane) becomes minimum in the case of FIG. 5A, is increased in the case of FIG. 5B, and becomes maximum in the case of FIG. 5C, for instance. As a result, the relationship between the magnitude of the detection signal DE and the thickness error shown in FIG. 3B is reversed from that described in the first embodiment, and it becomes necessary to appropriately change the control by the liquid crystal element drive circuit 400.

Also, in the first embodiment described above, an aspherical lens or a spherical lens is used as the spherical aberration detection lens and is designed such that the returning light from the disk is mostly condensed when the protective layer is thick. However, the present invention is not limited to this lens design. That is, even if the lens design is changed so that the returning light is condensed to form a beam spot that is somewhat larger than the mostly condensed beam spot, for instance, it is possible to detect fluctuations in the thickness error. In this case, however, the characteristics shown in FIG. 7 are rounded to some extent and the accuracy of detection is somewhat degraded when compared with the case of the first embodiment.

<Second Embodiment>

Next, a second embodiment will be described in which the construction described in the first embodiment is changed. In the first embodiment, as shown in FIG. 1, the astigmatic lens 8 and the spherical aberration detection lens 10 are arranged as separate construction elements. In contrast to this, in the second embodiment to be described below, the astigmatic lens 8 and the spherical aberration detection lens 10 are integrally formed as a single construction element.

Figure 13:
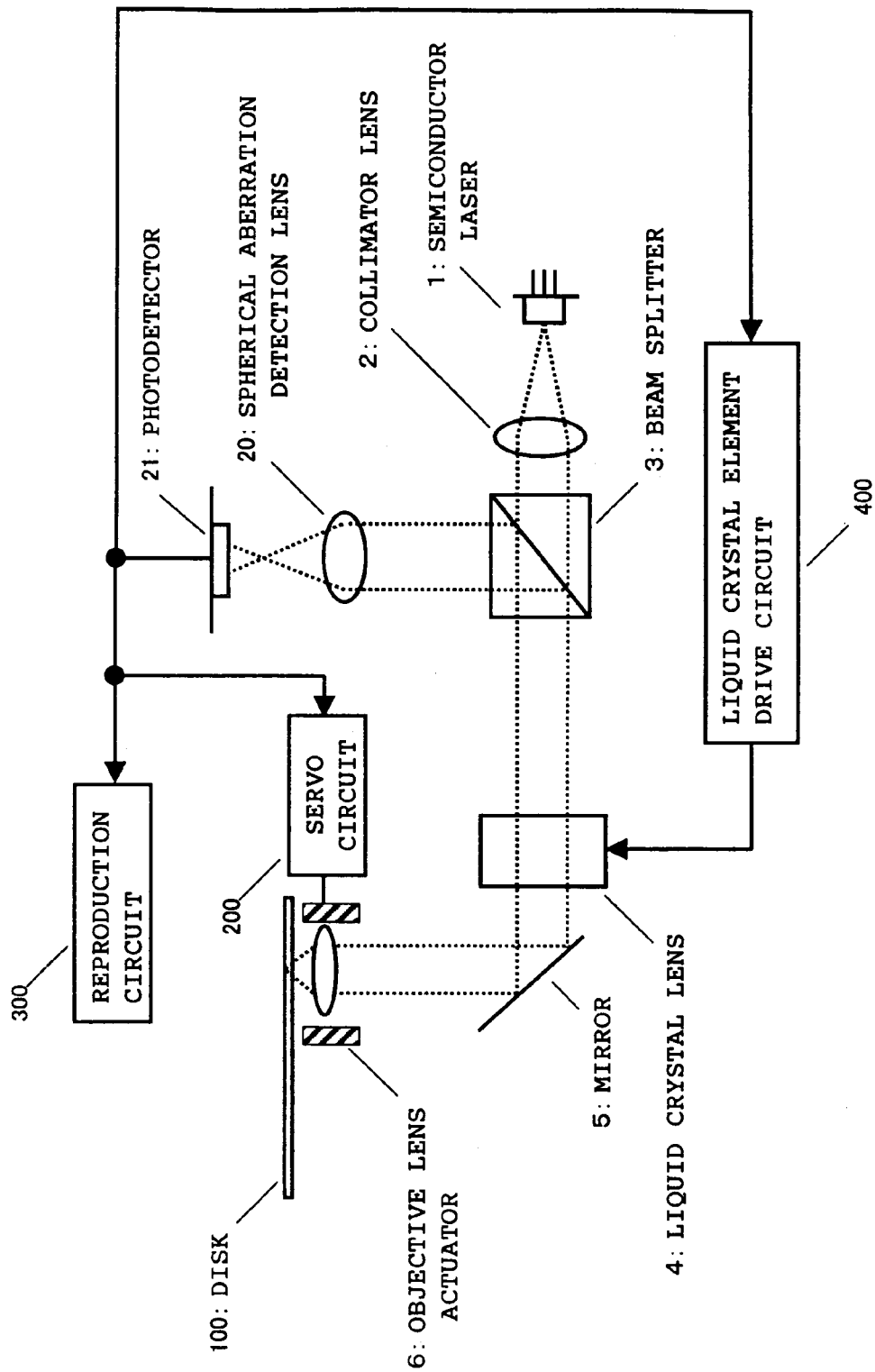
FIG. 13 shows a construction of an optical pickup device according to a second embodiment and a construction of an optical disk device having the optical pickup device built therein.

FIG. 13 shows an example of a construction according to the second embodiment. Note that in this drawing, the same construction elements as in FIG. 1 described above are given the same reference numerals and the description thereof will be omitted in this embodiment.

In the construction shown in FIG. 13, two optical actions that are the optical action of the astigmatic lens 8 and the optical action of the spherical aberration detection lens 10 in the construction shown in FIG. 1 are simultaneously given to a single spherical aberration detection lens 20. Also, a photodetector 21 has a sensor construction with which it is possible to output ally of signals generated by the photodetector 9 and the photodetector 11 in the construction shown in FIG. 1. Note that in the construction shown in FIG. 1, the astigmatic lens 8 and the spherical aberration detection lens 10 are arranged as separate construction elements, so that it is required to arrange the beam splitter 7. In this embodiment, however, it is not required to divide the optical path, so that the beam splitter 7 is eliminated from the construction of this embodiment.

Figure 14:
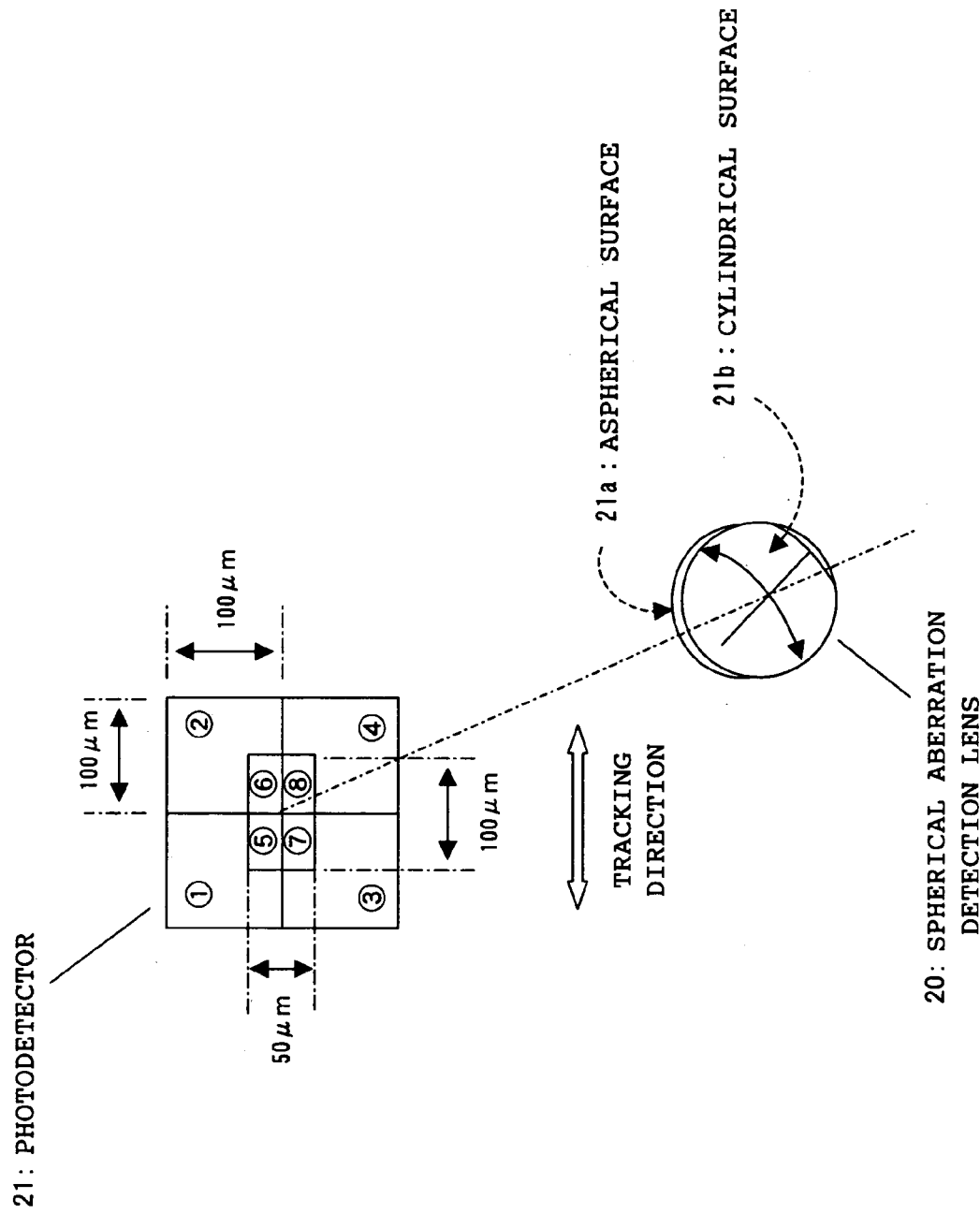
FIG. 14 shows a construction of a spherical aberration detection lens and a construction of a photodetector according to the second embodiment.

FIG. 14 shows a construction of the spherical aberration detection lens 20 and a construction of the photodetector 21 according to this embodiment. FIG. 14 also shows a positional relationship between these optical elements.

As shown in this drawing, the beam incident side of the spherical aberration detection lens 20 is set as a cylindrical surface 20b and the beam emitting side thereof is set as an aspherical surface 20a. The cylindrical surface 20b is curved in the direction of an arrow shown in FIG. 14.

Like in the first embodiment described above, the aspherical surface 20a is designed such that when the thickness of the protective layer is slightly greater or smaller than an optimum value, the returning light from the disk is condensed on the photodetector 21. That is, the aspherical surface 20a is designed such that under a state (on-Focus state) where laser light is appropriately focused with respect to the disk recording layer, when the thickness of the protective layer is slightly greater or smaller than the optimum value, the returning light from the disk is condensed on the photodetector 21. For instance, as shown in FIG. 5C, the aspherical surface 20a may be designed such that when the thickness of the protective layer is slightly greater than the optimum value, the returning light from the disk is condensed on the photodetector 21. Alternatively, the aspherical surface 20a may be designed such that when the thickness of the protective layer is slightly smaller than the optimum value, the returning light from the disk is condensed.

As shown in FIG. 14, the photodetector 21 includes four photosensors ((1) to (4)) arranged on the outer side and four photosensors ((5) to (8)) arranged on the inner side. The photodetector 21 is arranged such that the optical axis of the returning light from the disk goes through the center of the photodetector 21 and a tracking direction coincides with the direction of a division line dividing the photosensors into a group including the sensors (1), (2), (5), and (6) and a group including the sensors (3), (4), (7), and (8).

The spherical aberration detection lens 20 is arranged such that the curved direction of the cylindrical surface 20b is tilted by 45° in a counterclockwise direction with respect to the division line that divides the photosensors into the group including the sensors (1), (2), (5), and (6) and the group including the sensors (3), (4), (7), and (8). Also, a distance between the spherical aberration detection lens 20 and the photodetector 21 is adjusted such that laser light on the photodetector 21 has a circular shape under the on-Focus state. Further, the laser light is converged on the photodetector 21 such that around half the total light quantity of the laser light is received by a region formed by the photosensors (5), (6), (7), and (8). Here, it is possible to adjust the size of a laser spot on the photodetector 21 by changing the effectiveness of the condensing actions of the aspherical surface 20a and the cylindrical surface 20b of the spherical aberration detection lens 20. Accordingly, the aspherical surface 20a and the cylindrical surface 20b are designed with consideration given to the size of the region formed by the photosensors (5), (6), (7), and (8) such that the returning light is converged in a region that is somewhat larger than the region formed by the photosensors (5), (6), (7), and (8).

Figure 15:
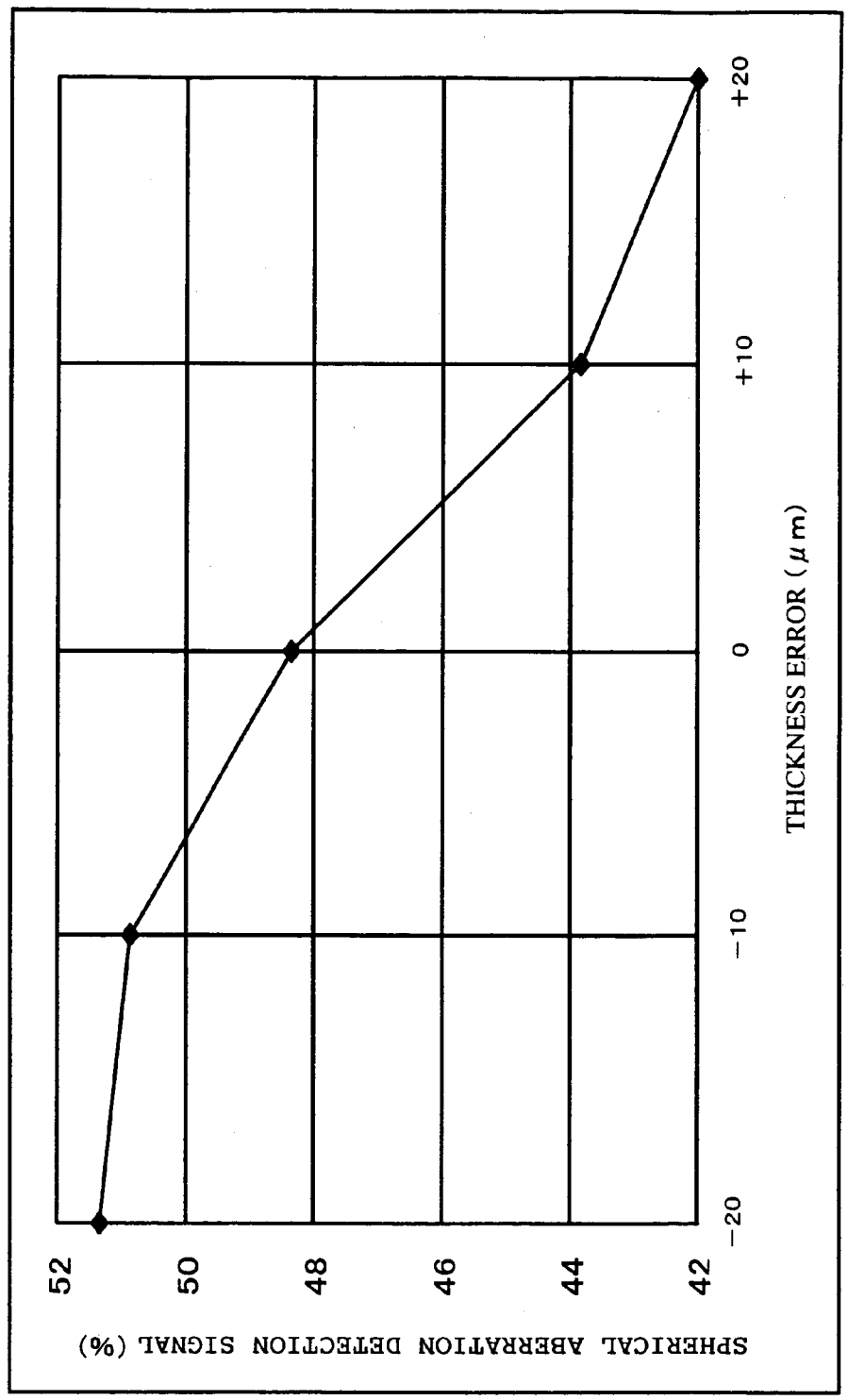
FIG. 15 shows a result of verification of a spherical aberration detection signal according to the second embodiment.
Figure 16:
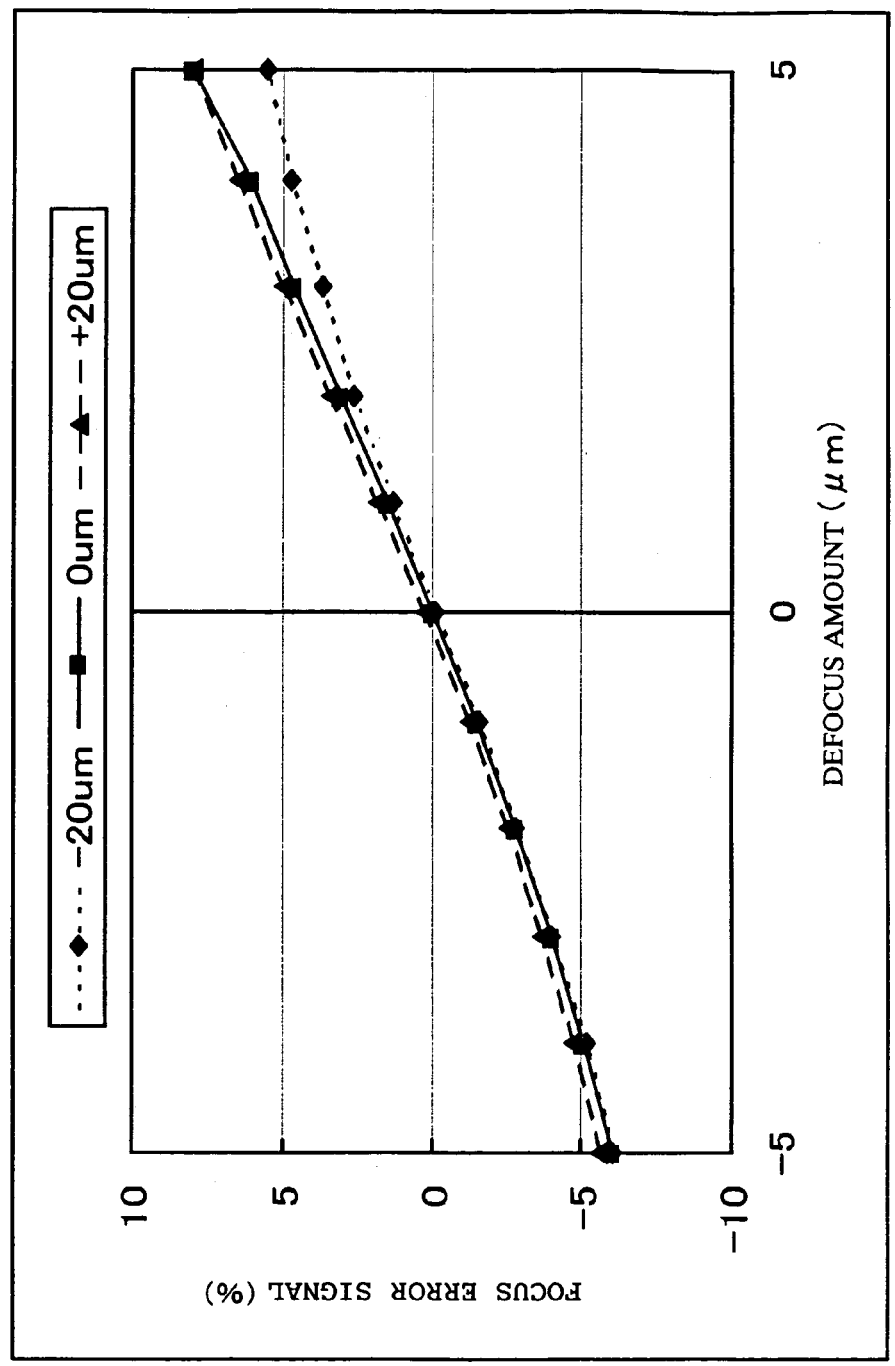
FIG. 16 shows a result of verification of a focus error signal according to the second embodiment.

FIGS. 15 and 16 each show results of verification conducted using an optical system constructed to have the constructions shown in FIGS. 13 and 14 described above.

It should be noted here that the photodetector 21 used in this verification has the size and shape shown in FIG. 14. Also, the aspherical surface 20a and the cylindrical surface 20b are designed such that when laser light is placed under the on-Focus state with respect to the recording layer, the diameter of a circular beam spot on the photodetector 21 becomes 150 ìm and around 48% of the total light quantity of returning light is irradiated onto the photodetectors (5), (6), (7), and (8) on the inner side. In addition, the aspherical surface 20a is designed such that the returning light is converged when the thickness of the protective layer is smaller than the optimum value (100 ìm) by several tens of ìm.

FIG. 15 shows results of verification (simulation) of a relationship between the thickness error of the protective layer and a spherical aberration detection signal (signal obtained by summing up outputs from the sensors (5), (6), (7), and (8)). Note that in this simulation, laser light is condensed on the recording layer under the on-Focus state.

As can be seen from the verification results, even if the spherical aberration detection lens 20 is constructed so as to simultaneously have both the spherical aberration correction action and the astigmatic action as shown in FIGS. 13 and 14, it is possible to obtain a detection signal corresponding to the direction and degree of the thickness error like in the first embodiment described above. As a result, with the construction shown in FIGS. 13 and 14, it is possible to appropriately perform the spherical aberration correction control like in the first embodiment.

FIG. 16 shows results of verification (simulation) of a relationship between focus displacement with respect to the recording layer and a focus error signal (signal obtained by subtracting a value obtained by summing up values from the sensors (2), (3), (6), and (7) from a value obtained by summing up values from the sensors (1), (5), and (8)). Note that this simulation was conducted for each of a case where the thickness of the protective layer assumes the optimum value (see a graph indicated with the mark " " in this drawing), a case where the thickness of the protective layer is smaller than the optimum value by 20 ìm (see a graph indicated with the mark " " in the drawing), and a case where the thickness of the protective layer is greater than the optimum value by 20 ìm (see a graph indicated with the mark " " in the drawing).

As can be seen from the verification results, even if the spherical aberration detection lens 20 is constructed so as to simultaneously have both the spherical aberration correction action and the astigmatic action as shown in FIGS. 13 and 14, it is possible to appropriately obtain a focus error signal corresponding to the direction and degree of focus displacement (defocus). As a result, with the construction shown in FIGS. 13 and 14, it is possible to appropriately perform the focus control like in the first embodiment described above.

It should be noted here that as can be seen from the verification results shown in FIG. 16, in addition to the effect described above, an effect is produced that even if a thickness error occurs in the protective layer, there are prevented significant changes in focus error signal characteristics. That is, an influence exerted by the thickness error of the protective layer on the focus error detection characteristics becomes relatively small. Therefore, even if the thickness error of the protective layer occurs during a reproduction operation, it is possible to continuously perform a high-precision focus control operation. As a result, it is a rare case that the shape of a beam spot on the photodetector 21 greatly deviates from a circular shape during an ordinary reproduction operation, and a beam spot having an almost circular shape is converged on the photodetector 21. As described above, even during an actual reproduction operation, a beam spot having a circular shape is maintained, so that it is possible to obtain a spherical aberration detection signal, which has almost the same characteristics as shown in FIG. 15, from the sensors (5), (6), (7), and (8). As a result, it can be expected that a stable spherical aberration correction operation can be realized even at the time of an actual reproduction operation.

As described above, in this embodiment, it is possible to appropriately perform the spherical aberration correction control and the focus control like in the first embodiment described above. In addition, in this embodiment, it is also possible to eliminate the astigmatic lens 8, the photodetector 9, and the beam splitter 7 from the construction according to the first embodiment. As a result, it is possible to realize further simplification of the device construction. In this embodiment, however, as shown in FIG. 15, the changing degree of the spherical aberration detection signal with respect to the thickness error is reduced compared with the case of the first embodiment described above (see FIG. 7). As a result, it can be said that the first embodiment is superior to the second embodiment in smoothly performing the spherical aberration correction control.

It should be noted here that in this embodiment, it is possible to replace the aspherical surface 20a with a spherical surface like in the first embodiment. In this case, however, like in the first embodiment (see FIG. 7), the signal characteristics of the spherical aberration detection signal are somewhat rounded and the accuracy of detection is degraded to some extent compared with the case of the aspherical surface.

In the first and second embodiments described above, spherical aberration is corrected by setting the thickness error of the protective layer as a target of evaluation. When a layer other than the protective layer exists between the recording layer and the disk surface, however, it is of course required to correct the spherical aberration by setting this layer as another evaluation target.

In addition, it is possible to change the focus control system, the tracking control system, and the construction of the sensor 9. Also, the shape of the sensor 11 is not limited to that shown in FIG. 4B and may be changed into another appropriate shape such as a round shape.

The embodiments of the present invention can be appropriately modified in various forms within the scope of the technical concept of the present invention.

What is claimed is:

1. An optical pickup device for performing recording and/or reproduction of information by irradiating laser light onto a disk, the optical pickup device comprising:
   (a) an astigmatic lens for receiving and converging a split laser beam reflected from the disk;
   (b) a photodetector for receiving the converged beam from the astigmatic lens;
   (c) an objective lens drive actuator for receiving a focus servo signal generated from an electrical signal outputted from the photodetector and adjusting the laser beam in an on-focus state;
   (d) a lens designed to converge reflection light from the disk when a thickness of an intermediate layer, between a disk surface and a recording layer, is greater or smaller than an optimum value by a predetermined degree;
   (e) a photodetector that receives the reflection light converged by the lens (d) to output an electric signal, and when the thickness of the intermediate layer assumes the optimum value, receives a predetermined portion of the reflection light with reference to a total light quantity of the reflection light, wherein components (d) and (e) detect a spherical aberration when the laser light is in an on-focus state; and (f) a diffusion angle converter that changes a diffusion angle of the laser light traveling toward the disk in accordance with a servo signal generated from the electric signal outputted from the photodetector (e), wherein component (f) corrects the spherical aberration when the laser light is in an on-focus state.

2. An optical pickup device according to claim 1, wherein the lens (d) is constructed using an aspherical lens that condenses the reflection light at an almost single point when the thickness of the intermediate layer is greater or smaller than the optimum value by the predetermined degree.

3. An optical pickup device according to claim 1, wherein the lens (d) is constructed using a spherical lens designed to set spherical aberration of the reflection light to be close to a minimum value when the thickness of the intermediate layer is greater or smaller than the optimum value by the predetermined degree.

4. An optical pickup device according to any one of claims 1 to 3, wherein the photodetector (e) is constructed using at least one photosensor, with a shape and arrangement of the photosensor being adjusted to receive around half a total light quantity of the reflection light converged by the lens when the thickness of the intermediate layer assumes the optimum value.

5. An optical pickup device according to any one of claims 1 to 3, wherein the diffusion angle converter is arranged on an optical path extending from a laser light source to the disk, and constructed using at least one lens that changes the diffusion angle of the laser light in accordance with the signal from the photodetector.

6. An optical pickup device according to claim 5, wherein the diffusion angle converter includes a liquid crystal lens that adjusts the diffusion angle of the laser light by changing its own refractive index in accordance with the servo signal.

7. An optical pickup device according to claim 5, wherein the diffusion angle converter includes a lens actuator that adjusts the diffusion angle of the laser light by changing a distance between lenses in accordance with the servo signal.

8. An optical pickup device according to any one of claims 1 to 3, wherein:

one of lens surfaces of the lens (d) is formed to have a spherical or aspherical shape with which the reflection light is condensed when the thickness of the intermediate layer is greater or smaller than the optimum value by the predetermined degree, and the other lens surface is formed to have a cylindrical shape with which an astigmatic action is introduced into the reflection light; and the photodetector (e) includes:

a photosensor portion that receives around half a total light quantity of the reflection light converged by the lens when the thickness of the intermediate layer assumes the optimum value; and a photosensor portion that has a pair of light-receiving regions arranged in a diagonal line direction and another pair of light-receiving regions arranged in another diagonal line direction, in which when the laser light is appropriately condensed with respect to the recording layer, the reflection light from the disk is uniformly received by the two pairs of light-receiving regions, and when condensing displacement occurs with respect to the recording layer, a quantity of the reflection light received by one of the two pairs of light-receiving regions becomes larger than a quantity of the reflection light received by the other pair of light-receiving regions.

9. A recording and/or reproducing device comprising:

an optical pickup including an astigmatic lens for receiving and converting a split laser beam reflected from the disk, a photodetector for receiving the converged beam from the astigmatic lens and an objective lens drive actuator for receiving a focus servo signal and adjusting the laser beam in an on-focus state; and a servo circuit including circuitry associated with the photodetector for generating a focus error signal and a focus servo circuit for receiving the focus error signal and generating the focus servo signal, the optical pickup further including:

(a) a lens designed to converge reflection light from the disk when a thickness of the intermediate layer, between a disk surface and a recording layer, is greater or smaller than an optimum value by a predetermined degree;

(b) a photodetector that receives the reflection light converged by the lens (a) to output an electric signal, and when the thickness of the intermediate layer assumes the optimum value, receives a predetermined portion of the reflection light with reference to total light quantity of the reflection) light, wherein components (a) and (b) detect a spherical aberration when the laser light in an on-focus state; and (c) a diffusion angle converter that changes a diffusion angle of the laser light traveling toward the disk in accordance with a servo signal from a drive circuit, thereby correcting the spherical aberration when the laser light is in an on- focus state, the servo circuit further including:

(d) the drive circuit for generating the servo signal for correcting the spherical aberration from the electric signal outputted form the photo detector (b).

10. A recording and/or reproducing device according to claim 9, wherein the lens (a) is constructed using an aspherical lens that condenses the reflection light at an almost single point when the thickness of the intermediate layer is greater or smaller than the optimum value by the predetermined degree.

11. A recording and/or reproducing device according to claim 9, wherein the lens (a) is constructed using a spherical lens designed to set spherical aberration of the reflection light to be close to a minimum value when the thickness of the intermediate layer is greater or smaller than the optimum value by the predetermined degree.

12. A recording and/or reproducing device according to any one of claims 10, 11, and 9, wherein the photodetector (b) is constructed using at least one photosensor, with a shape and arrangement of the photosensor being adjusted to receive around half a total light quantity of the reflection light converged by the lens when the thickness of the intermediate layer assumes the optimum value.

13. A recording and/or reproducing device according to any one of claims 10, 11, and 9, wherein the diffusion angle converter is arranged on an optical path extending from a laser light source to the disk, and constructed using at least one lens that changes the diffusion angle of the laser light in accordance with the signal from the photodetector.

14. A recording and/or reproducing device according to claim 13, wherein the diffusion angle converter includes a liquid crystal lens that adjusts the diffusion angle of the laser light by changing its own refractive index in accordance with the servo signal.

15. A recording and/or reproducing device according to claim 13, wherein the diffusion angle converter includes a lens actuator that adjusts the diffusion angle of the laser light by changing a distance between lenses in accordance with the servo signal.

16. A recording and/or reproducing device according to any one of claims 10, 11, and 9, wherein:
   one of lens surfaces of the lens (a) is formed to have a spherical or aspherical shape with which the reflection light is condensed when the thickness of the intermediate layer is greater or smaller than the optimum value by the predetermined degree, and the other lens surface is formed to have a cylindrical shape with which an astigmatic action is introduced into the reflection light; and
   the photodetector (b) includes:
   a photosensor portion that receives around half total light quantity of the reflection light converged by the lens when the thickness of the intermediate layer assumes the optimum value; and
   a photosensor portion that has a pair of light-receiving regions arranged in a diagonal line direction and another pair of light-receiving regions arranged in another diagonal line direction, in which when the laser light is appropriately condensed with respect to the recording layer, the reflection light from the disk is uniformly received by the two pairs of light-receiving regions, and when condensing displacement occurs with respect to the recording layer, a quantity of the reflection light received by one of the two pairs of light-receiving regions becomes larger than a quantity of the reflection light received by the other pair of light-receiving regions.

* * * * *